Jan. 14, 1936.  J. H. HAMMOND, JR  2,027,527
NAVIGATIONAL GUIDE SYSTEM
Original Filed Aug. 17, 1929  10 Sheets-Sheet 3

INVENTOR.
John Hays Hammond, Jr.
BY Albert M. Austin
ATTORNEY.

Jan. 14, 1936.    J. H. HAMMOND, JR    2,027,527
NAVIGATIONAL GUIDE SYSTEM
Original Filed Aug. 17, 1929    10 Sheets-Sheet 5

Fig. 6

INVENTOR.
John Hays Hammond, Jr.
BY Albert M. Austin
ATTORNEY.

Jan. 14, 1936.  J. H. HAMMOND, JR  2,027,527
NAVIGATIONAL GUIDE SYSTEM
Original Filed Aug. 17, 1929  10 Sheets-Sheet 8

INVENTOR.
John Hays Hammond, Jr.
BY Albert M. Austin
ATTORNEY.

Patented Jan. 14, 1936

2,027,527

UNITED STATES PATENT OFFICE 2,027,527

NAVIGATIONAL GUIDE SYSTEM

John Hays Hammond, Jr., Gloucester, Mass.

Application August 17, 1929, Serial No. 386,587
Renewed December 7, 1934

12 Claims. (Cl. 250—11)

This invention relates to a navigational guide system, and more particularly to a system for designating to a pilot his position with reference to a fixed location.

This invention as specifically applied to a aeronautical guide system provides for a means whereby the pilot of an aircraft may be informed of his position with reference to a landing field, and is particularly adaptable in cases where the visibility is poor. This system is particularly advantageous in cases where the aircraft is flying at night or in foggy weather, or when the clouds intervene between the aircraft and the land.

The invention contemplates a system whereby signals emanating from the aircraft are impressed upon a plurality of direction finders located in various parts of the field. These direction finders are oriented in order to effect a predetermined responsiveness. A plotting mechanism is provided which is actuated in response to the orientation of said direction finders and which designates the position of the aircraft upon a facsimile of the terrane of the landing field. This facsimile of the landing field with the position of the aircraft designated thereon, is transmitted to the pilot by television. The elevation of the aircraft above the ground is determined from the direction finders and transmitted to the aircraft as part of the picture. The position of the plane in relation to the landing field, being designated as a continuous operation, the pilot can observe how he is moving with respect to the terrane and can therefore safely guide his aircraft towards a landing field.

This invention has been described with reference to its application to an aircraft but it is obvious that it may be applied to any moving craft such as a boat or a submarine.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which

Like reference characters denote like parts in the several figures of the drawings.

In the following description and in the claims parts will be identified by specific names for convenience, but they are intended to be as generic in their application to similar parts as the art will permit.

Figure 1:
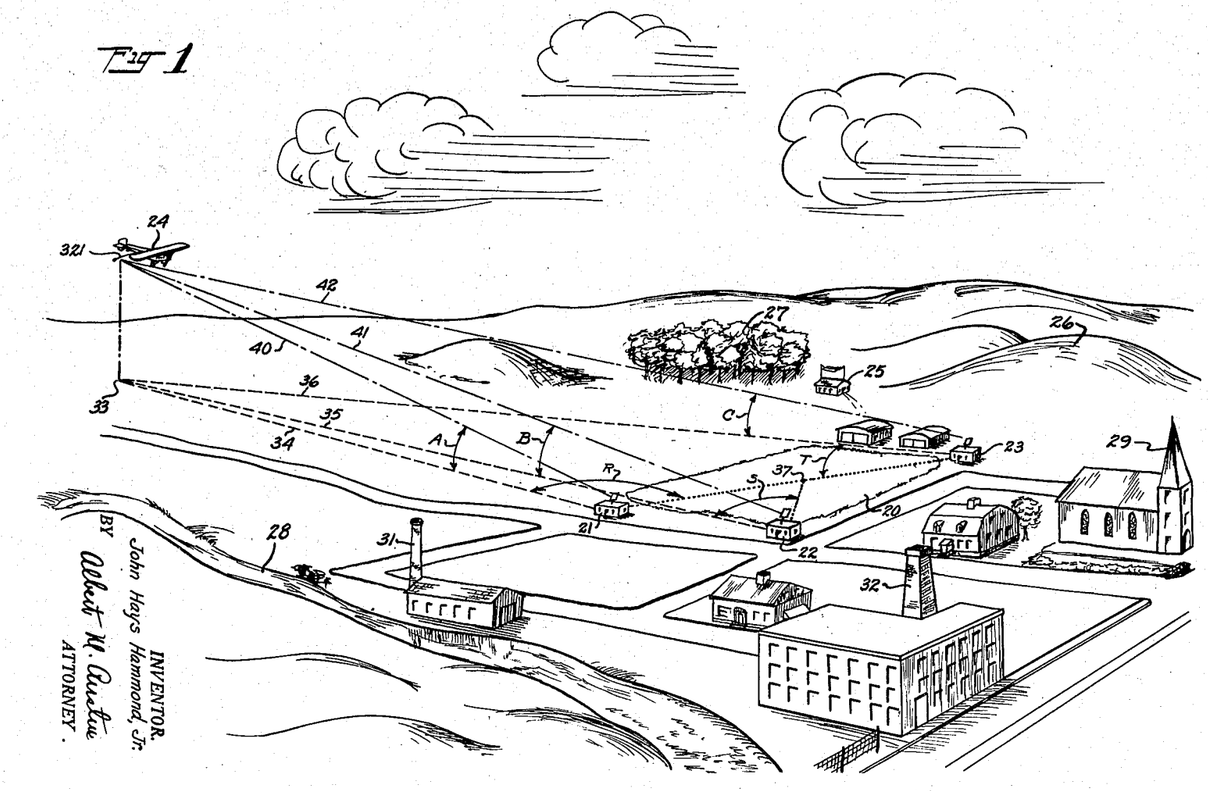
Fig. 1 shows a birds-eye view of a landing field and surrounding country.

In the adaptation of the invention to an aeronautical system shown in Fig. 1, the landing field is indicated at 20, and the three direction finder stations at 21, 22, and 23. The approaching airplane is shown at 24, and the television transmitting station at 25. Other objects of the landscape are shown, such as a hill 26, a forest 27, river 28, a church steeple 29, and two tall chimneys 31 and 32.

The projection of the airplane on the surface of the earth is indicated at the point 33. Joining this point with the three direction finder stations are three lines 34, 35 and 36, which form azimuth angles R. S. T. with lines drawn from the direction finder stations to the center of the field 37. From the plane, 3 lines, 40, 41 and 42 are drawn to the three finder stations. These lines form elevation angles A, B, and C with the lines 34, 35 and 36, respectively.

Figure 2:
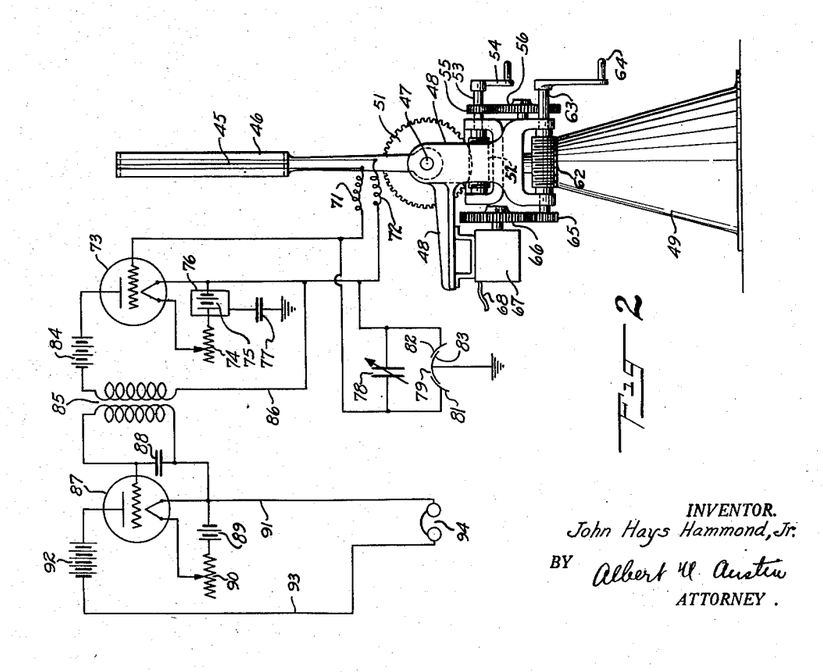
Fig. 2 is a side elevation of one of the direction finders with its associated receiving system.
Figure 3:
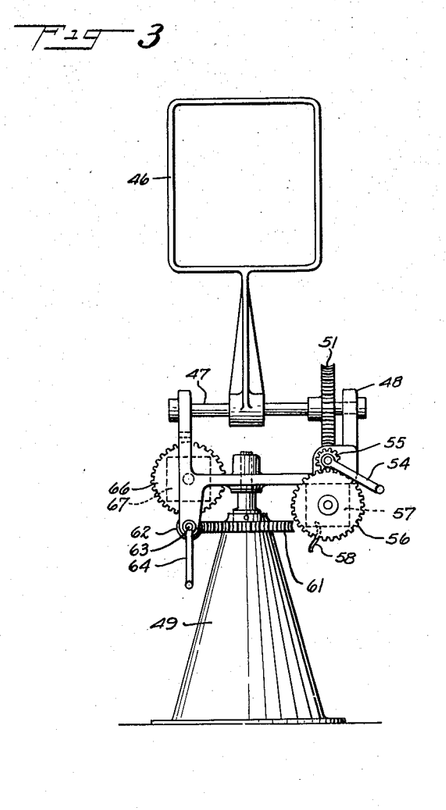
Fig. 3 is a front elevation of one of the direction finders.

The airplane 24 transmits a wireless signal which is picked up by the direction finder shown in Fig. 2. This direction finder consists of a pick up device in the form of a coil 45, wound around a frame of insulating material 46, which is rigidly secured to a shaft 47. This shaft has bearings in a frame 48, which is pivotally mounted on a base 49. Secured to the shaft 47 is a worm wheel 51, which meshes with the worm 52 mounted on a shaft 53, which has bearings in the frame 48. To this shaft is fastened a handle 54 and a gear 55, which meshes with a second gear 56 carried by the shaft of an electrical transmitter 57, which is connected to an electrical cable 58.

Any suitable transmitter and the associated repeater may be used such as are fully described in Patent No. 1,431,140, issued Oct. 3, 1922 and indicated in Figs. 18, 19, 20, 21 of said patent.

Secured to the base 49, is a worm wheel 61 meshing with the worm 62, mounted on a shaft 63, which has bearings in the frame 48. Secured to one end of the shaft 63 is a handle 64, and to the other end is a gear 65, which meshes with a second gear 66 mounted on the shaft of an electrical transmitter 67, which is connected to an electrical cable 68.

The coil 45 is connected to two flexible conductors 71 and 72. The conductor 71 is connected to the grid of a vacuum tube 73, and the conductor 72 is connected to one side of the filament of this tube. The other side of the filament is connected through a variable resistance 74, to one side of a battery 75, the other side of which is connected to the conductor 72. This battery is enclosed in a metallic box 76, which is connected through a condenser 77 to the ground. Across the conductors 71 and 72 is mounted a variable condenser 78 and a balancing condenser 79. This latter consists of two sets of fixed plates 81 and 82, and a set of movable plates 83, which are connected to ground. The plate of the vacuum tube 73 is connected to one side of the battery 84, the other side of which is connected to one end of the primary of a transformer 85, the other end of which is connected by a conductor 86 to the conductor 72. One side of the secondary of the transformer 85 is connected to the grid of a second vacuum tube 87, and to one side of a condenser 88. The other side of this condenser is connected to the other side of the secondary, and also to one side of the filament of the tube 87, and the other side of this filament is connected through a variable resistance 90 to a filament battery 89. The other side of this battery is connected to the condenser 88; and a conductor 91.

The plate of the tube 87 is connected to one side of a battery 92, the other side of which is connected to a conductor 93. The conductors 91 and 93 are connected by a flexible lead to a pair of headphones 94.

The plotting mechanism shown in Figs. 4 to 10 consists of a frame 101, in which is rotatably mounted a shaft 102. Pinned to the shaft 102 is a bracket 103, upon which is mounted a disc 104, Fig. 7. Secured to this disc are three electrical repeaters 105, 106 and 107. These are similar to the type described in Patent No. 1,431,140 previously referred to. Secured to the shafts of these repeaters are three pinions 108, 109 and 110 which mesh with three gears 111, 112 and 113. These gears are mounted on shafts 114 (see Fig. 10) which are mounted in insulating bushings 115, carried by brackets 116. These shafts are also mounted on insulating bushings 117 in the plate 104. Secured to the end of the shaft 114 is a light casing 118, in which is mounted a small incandescent lamp 119. Pressing against the central terminal of this lamp is a spring 121, which is mounted on a piece of insulation 122, carried by the light casing 118. This spring is always in contact with the metallic plate 104. Mounted in the end of the casing 118 is a suitable set of lenses 123, which cause the light from the lamp 119 to be formed into a parallel beam. Covering the opening of the casing 118 is a cap 124, which is provided with a slot 125 for causing this beam to be projected on the plate 104, as a narrow ray of light.

Figure 4:
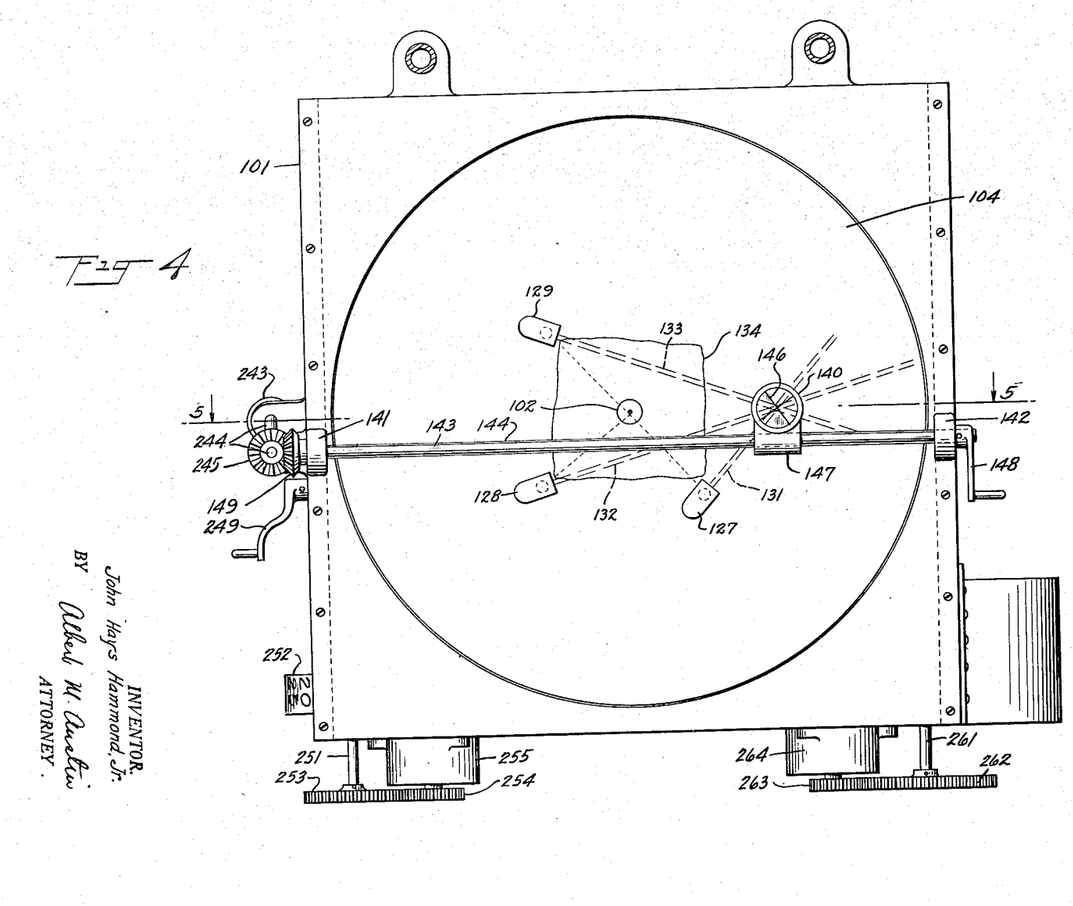
Fig. 4 is a front elevation of the plotting mechanism.
Figure 5:
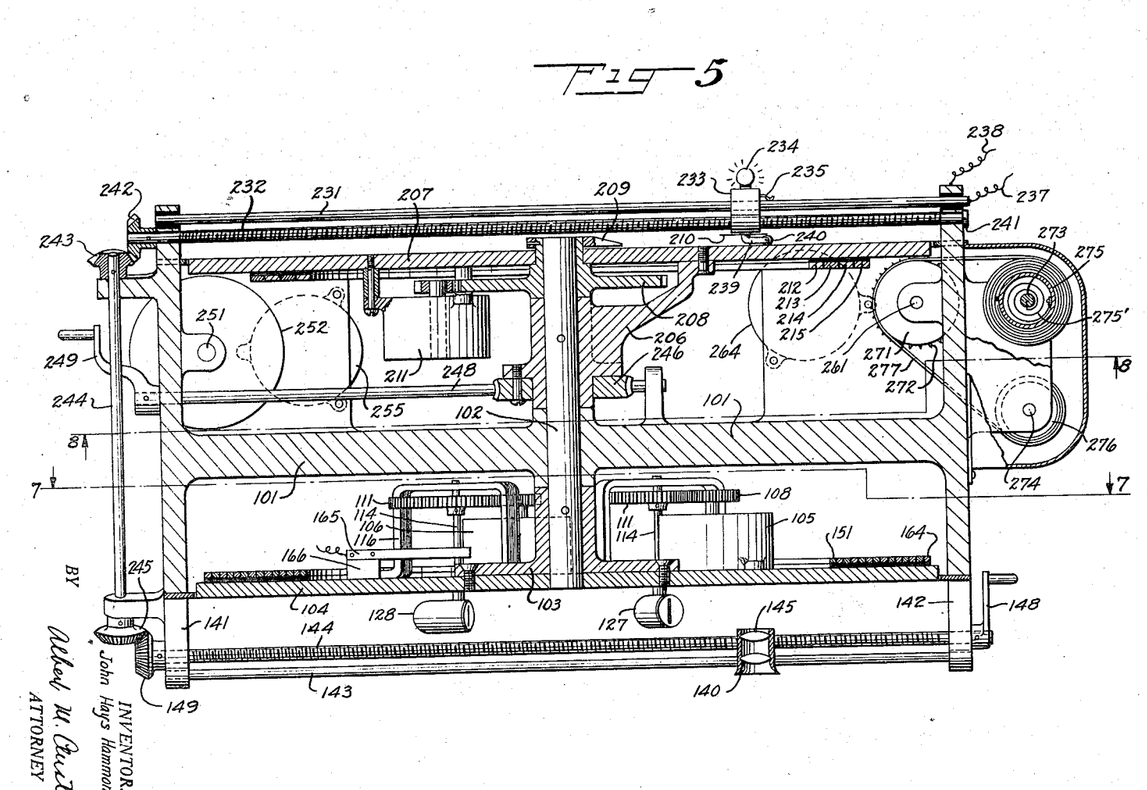
Fig. 5 is a sectional view taken on line 5—5 of Fig. 4.

The three repeaters 105, 106 and 107 control three of these light projectors, 127, 128 and 129, as seen in Fig. 4. The three beams of light emitted by the light projectors 127, 128 and 129 are shown in 131, 132 and 133 respectively. It will be noticed that the three light projectors are located in positions on the disc 104, which correspond to the positions of the direction finders 21, 22 and 23, with respect to the landing field 20. This field is outlined at 134 on the disc 104. It will be noticed, however, that the shape of the landing field and the positions of the three light sources are a mirror image of the actual relative position of the landing field and range finders.

The frame 101 is provided with extensions 141 and 142, in which is fixedly mounted a plain rod 143 and in which is rotatably mounted a threaded rod 144. Slidably mounted on the rod 143 is an eye piece 140, in which is mounted a lens system 145, which is focused on the plate 104 so as to magnify the image of this plate. Cross hairs 146 are mounted in the optical system 145, thus indicating the central point of this system. This optical system is carried in a frame 147, which is slidably mounted on the rod 143, and is threaded on to the shaft 144. Secured to one end of the shaft 144 is a handle 148, and on the other end is a bevel gear 149. On the back of the plate 104 are mounted 14 circular segments of conducting material 151 to 164, (see Fig. 7). The segment 151 is connected to the three common return wires of the repeaters 105, 106 and 107. The segments 152, 153 and 154 are connected to the other three wires of the repeater 106. The segments 155, 156 and 157 are connected to the other three wires of the repeater 107, and the segments 158, 159 and 160 are connected to the other three wires of the repeater 105. The segment 161 is connected to a contact brush 165, which is carried by a piece of insulation 166, mounted on the disc 104. This contact brush engages the shaft of the gear 112. The contact segment 162 is connected to a similar brush, engaging the shaft of the gear 113, and the contact segment 163 is connected to a third brush, engaging the shaft of the gear 111. The contact segment 164 is connected to the plate 104. Engaging the 14 contact segments 151 to 164 are 14 brushes, 171 to 184, which are connected to 14 conductors 191 to 204. The brushes 171 to 184 are mounted on a block of insulating material 185, which is mounted on the frame 101.

Figure 6:
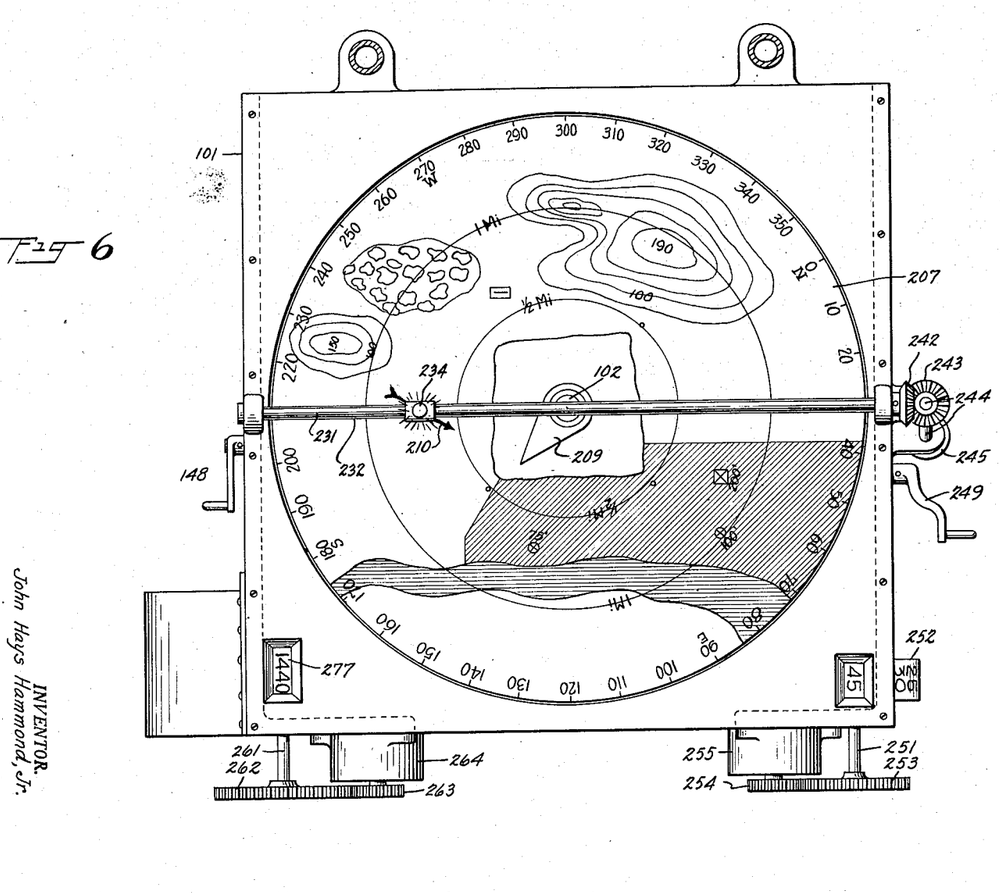
Fig. 6 is a rear elevation of the plotting mechanism showing the chart and markers to be transmitted.
Figure 7:
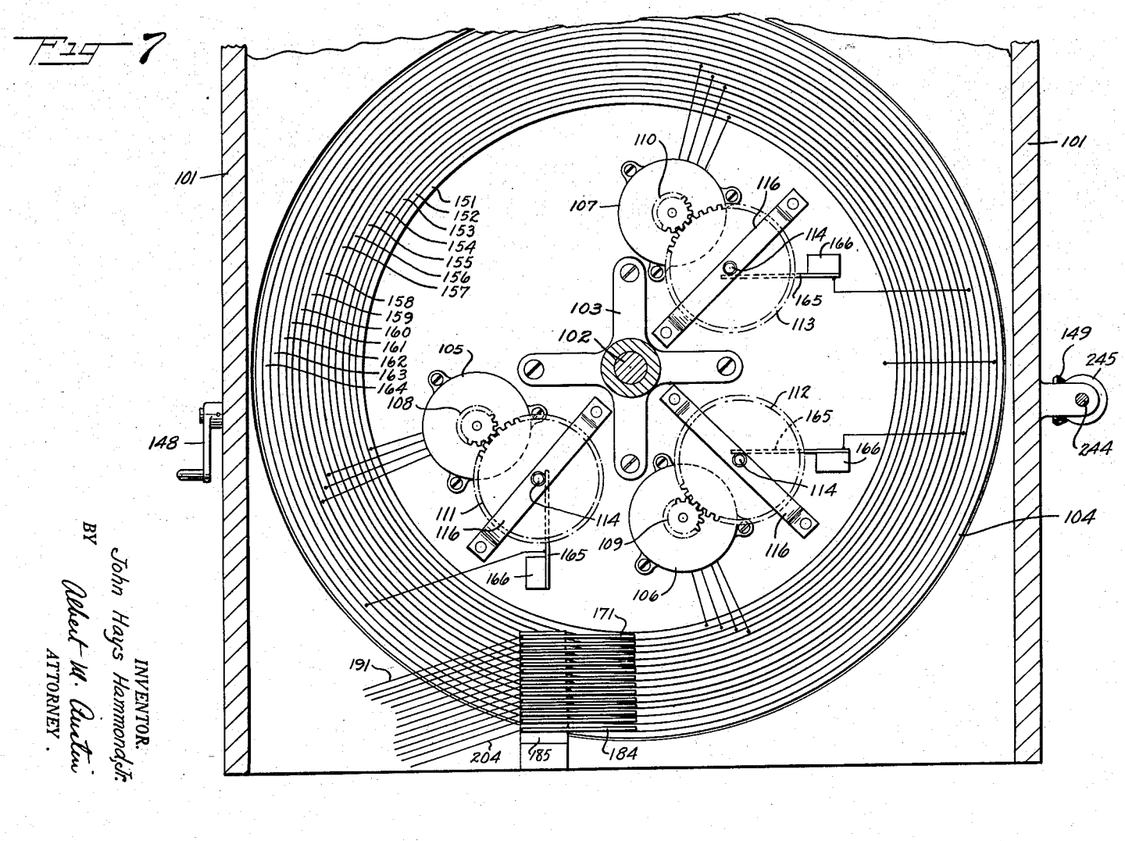
Fig. 7 is a sectional elevation taken on line 7—7 of Fig. 5.

Secured to the other end of the shaft 102 is a bracket 206, to which is fastened a circular plate 207. The outer face of this disc is provided with a map of the country surrounding the landing field 20, with the heights of the various objects of the landing indicated thereon as shown in Fig. 6.

Loosely mounted on the shaft 102 is a gear 208, to the hub of which is pinned a pointer 209. The gear 208 meshes with the pinion of an electrical repeater 211, which is mounted on the disc 207. Secured to, but insulated from the disc 207, are four circular contact segments 212 to 215. The segment 212 is connected to the common return of the repeater 211, and the segments 213 to 215 are connected to the other three wires of the repeater. Making contact with the four segments 212 to 215 are four brushes 216 to 219. These four brushes are connected to four conductors 221 to 224, and are mounted on a block of insulating material 225, which is secured to the frame 101.

Securely mounted in, but insulated from the frame 101 is a rod 231. Rotatably mounted in the frame 101 is a threaded rod 232. Slidably mounted on the fixed rod 231 is a block of insulating material 233, in which is mounted a lamp 234, one side of which is connected to a brush 235, which engages the rod 231, and the other side is connected to a threaded block of conducting material 236 see Fig. 9, which is secured to the block of insulating material 233. The rod 231 is connected to a conductor 237, and the frame 101 is connected to a conductor 238, of a supply. Pivotally mounted under the block 236 is an arm 239 on the end of which is rotatably mounted a roller 240, which rides over the plate 207 and which is preferably provided with a soft rubber periphery. Secured to the arm 239 is a pointer 210.

On one end of the threaded shaft 232 is pinned a collar 241, and on the other end is pinned a bevel gear 242, which meshes with another bevel gear 243. This gear is pinned to one end of a shaft 244, which has bearings in the frame 101. To the other end of the shaft 244 is pinned a bevel gear 245, which meshes with the bevel gear 149.

Figure 8:
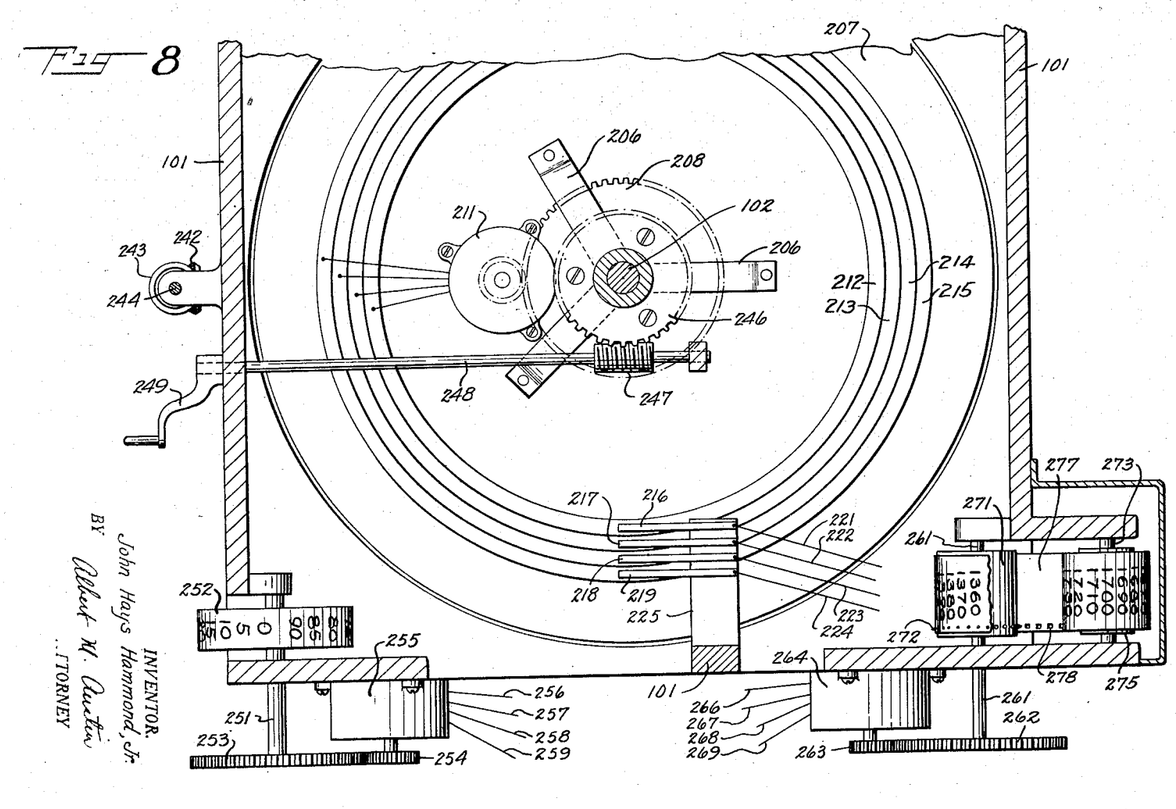
Fig. 8 is a sectional elevation taken on line 8—8 of Fig. 5.
Figure 9:
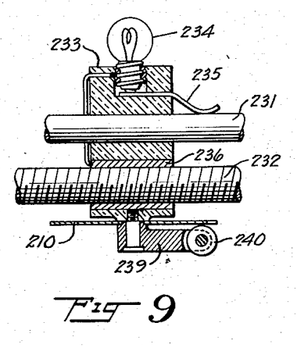
Fig. 9 is a detail of the light source of the plotting mechanism indicated in Fig. 6.
Figure 10:
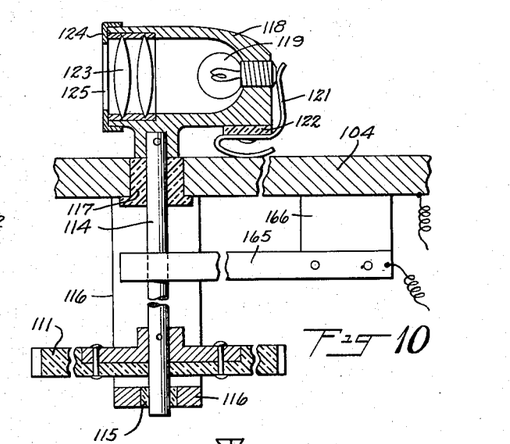
Fig. 10 is a detail of one of the light projectors of the plotting mechanism indicated in Fig. 4.

Secured to the bracket 206 Fig. 8 is a worm wheel 246, which meshes with a worm 247 mounted on a shaft 248, which has bearings in the frame 101. Secured to the end of the shaft 248 is a handle 249. Rotatably mounted in the frame 101 is a shaft 251, to which is secured a cylindrical dial 252, carrying numbers from zero to 90. Fastened to the lower end of the shaft 251 is a gear 253, which meshes with a pinion 254, rotated by an electrical repeater 255, which is mounted on the frame 101. The 4 wires of this repeater are indicated at 256 to 259. Rotatably mounted in the frame 101 is a shaft 261, to which is secured a gear 262, which meshes with a pinion 263, rotated by an electrical repeater 264, which is mounted on the frame 101. The four wires of this repeater are indicated at 266 to 269. Secured to the shaft 261 is a drum 271, which is provided with teeth 272. Rotatably mounted in the frame 101 are two shafts 273 and 274 see Fig. 5, on which are mounted two drums 275 and 276. Wound to these drums is a long strip of flexible material 277, on which is marked a series of numbers corresponding to various altitudes. This strip passes over the drum 271, and is provided with a plurality of perforations 278 see Fig. 8, which are engaged by the teeth 272. Inside the drums 275 and 276 are coil springs 275' (not shown), which tend to turn these drums in a clock-wise and counter clockwise direction respectively, in reference to Fig. 5. In this manner, the strip 277 is always kept taut over the drum 271.

Figure 12:
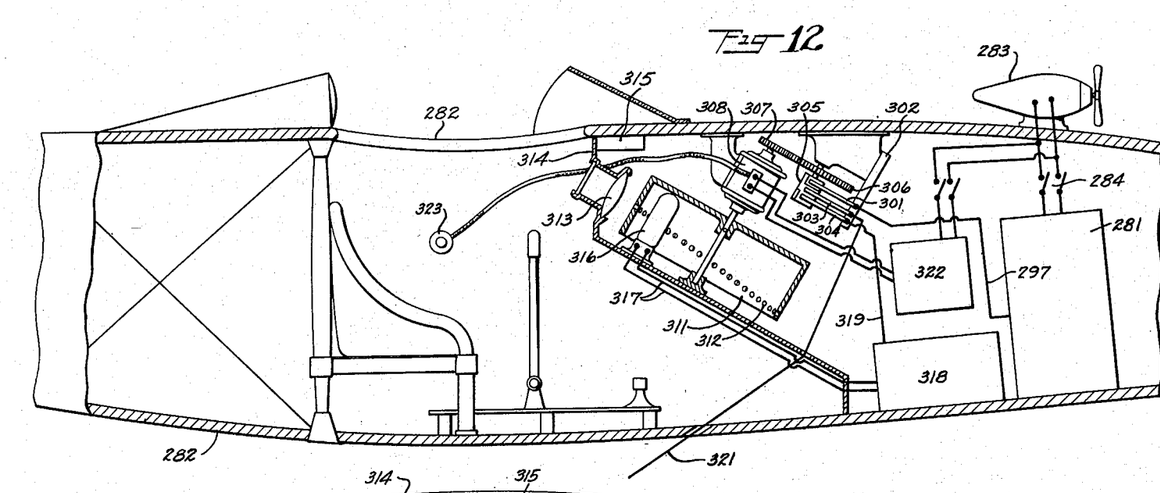
Fig. 12 is a sectional elevation of the airplane showing the television receiver and the signal transmitter.
Figures 14, 17, 18:
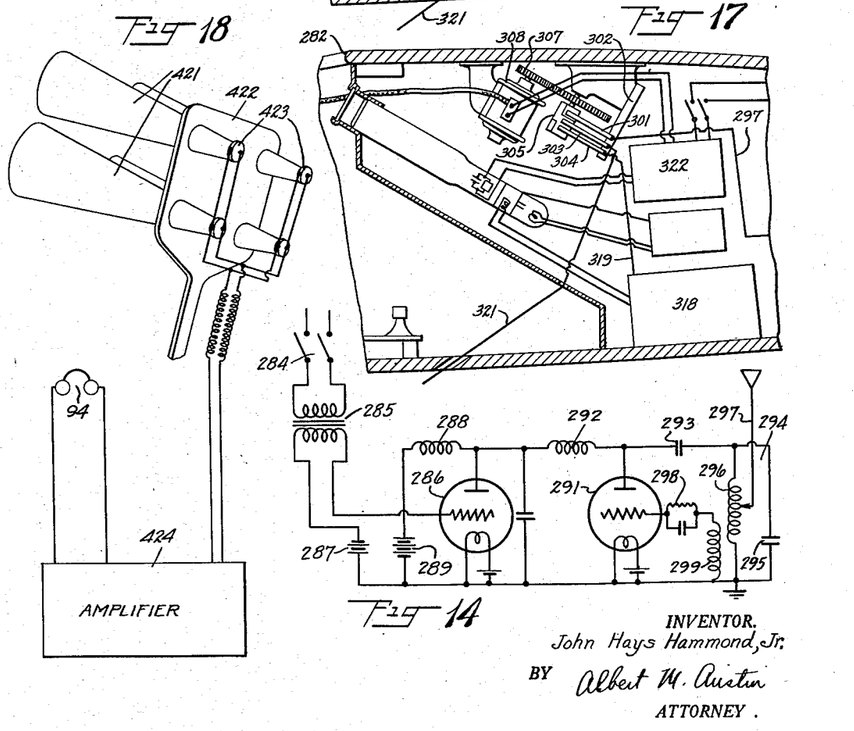
Fig. 14 is a diagram of the signal transmitting apparatus.
Fig. 17 is a sectional view of a television receiving apparatus employing a Braun tube for a receiving means.
Fig. 18 is a perspective of a ground receiving apparatus which may be used to take the place of the radio direction finder shown in Fig. 2.

For transmitting the signals from the airplane a signal transmitter 281 is provided in the airplane 282 (see Figs. 12 and 14). The transmitter is supplied with current from a wind driven generator 283, the two leads from which are connected through a switch 284, to a primary of a transformer 285, one side of the winding of which is connected to the grid of an oscillator tube 286, the other side of the winding of the transformer 285 being connected through a battery 287, to one side of the filament of the tube 286. The plate of this tube is connected through an inductance 288, and a battery 289, to the same side of the filament. The plate of this tube is also connected to the plate of a second vacuum tube 291, through an inductance 292. The plate of the second tube 291 is connected through a condenser 293, to a tuned circuit 294, consisting of a capacity 295 and an inductance 296, one side of which is grounded. Adjustably connected to the inductance 296 is a conductor 297, which is connected to the antenna, as will be described in connection with Fig. 12. The grid of the tube 291 is connected through a grid leak 298 and an inductance 299 to the ground. This system forms a simple oscillator, the output of which is modulated by the tube 291.

The conductor 297 (see Fig. 12), is connected to a brush 301 mounted on a strip of insulation 302 which is supported from the frame of the airplane. Also mounted on this strip of insulation are two brushes 303 and 304, which, with the brush 301 engage a commutator 305. This commutator is so constructed that the brushes 301 and 304 will be alternately connected with the brush 303, each being connected for a half revolution of the commutator. The commutator 305 is mounted on a gear 306, which meshes with a pinion 307, the ratio between the two being two to one. The pinion 307 is mounted on the shaft of a motor 308, which is supported from the frame of the airplane. On the shaft of this motor is mounted a drum 311, provided with a plurality of holes 312, arranged on a helix on the periphery of this drum. In front of the drum 311 is mounted a lens 313, in an opening in the instrument board 314. Mounted above this lens is a standard compass 315. Mounted inside of the drum 311 is a photo electric cell 316, which is connected by a cable 317 to a television receiver 318. This may be of any suitable and well known construction. The television receiver is connected by a conductor 319 to the brush 304 and the brush 303 is connected to a trailing antenna 321.

The motor 308 is supplied by current from the wind driven generator 283, this supply being controlled by a synchronizing means 322, and a control means 323, which is operated by the aviator, so as to synchronize the drum 311 with the transmitting apparatus on the ground.

Figure 11:
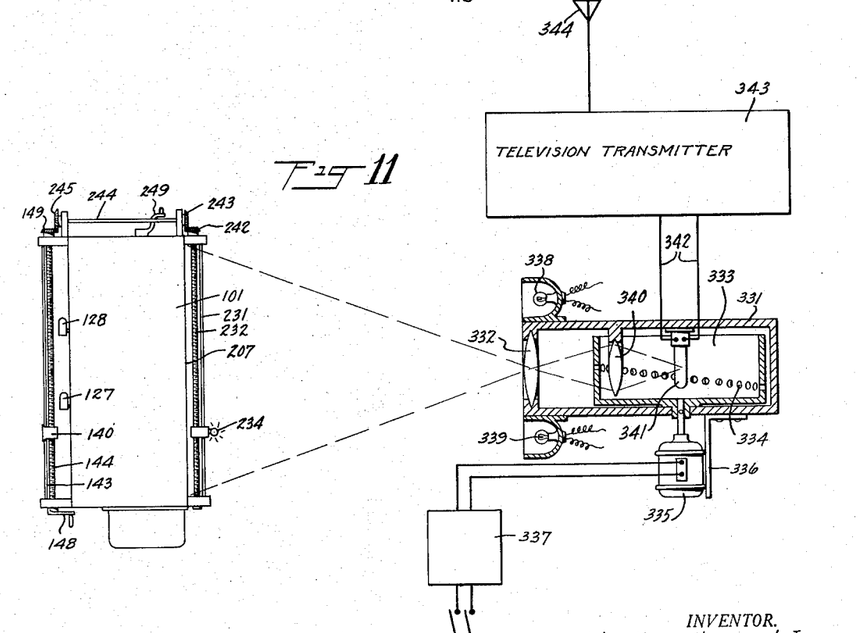
Fig. 11 is a plan view of the television transmitting apparatus used in connection with the plotting mechanism.

For transmitting a view of the disc 207, a television transmission apparatus is provided as shown in Fig. 11. This consists of a casing 331 in the end of which is mounted lens 332, which focuses the image of the disc 207 on the surface of a drum 333. This drum is provided with a plurality of holes 334, arranged along the line of a helix on this drum. The drum 333 and the location of the holes 334 are similar to the drum 311 and the holes 312. The drum 333 is mounted on the shaft of a motor 335, which is supported on a bracket 336, secured to the casing 331. The motor 335 is driven from a source of supply not shown, and its speed is controlled by a synchronizing mechanism 337. The synchronizing mechanisms 337 and 322 may be of any standard and well known construction for television systems. Also connected to the supply, are two lights 338 and 339, for illuminating the disc 207. Mounted inside the drum 333 is a lens 340 and a photo electric cell 341, which is connected by a cable 342, to a television transmitting apparatus 343, which may be of any well known construction, the output of which is connected to an antenna 344.

In the operation of this form of the invention when an airplane 24 approaches the landing field 20, signals will be sent from the transmitter 281 over the conductor 297, brush 301, commutator 305, brush 303, to the antenna 321. These signals will be sent intermittently due to the rotation of the commutator 305 and will be received by the three direction finder stations 21, 22 and 23. This reception is accomplished by the loop 45, which picks up the signals which are amplified by the tubes 73 and 87, and are then heard in the phones 94. The two systems of receptions which may be used are either the maximum or the minimum effect with the coil 45. It is found, however, that the minimum effect gives the most accurate results so that system will be described here, though the maximum effect may be used when found to be advantageous.

With the system using the minimum effect, the coil 45 gives a minimum signal when the plane of the coil is normal or perpendicular to the line joining the coil to the plane. Even though the coil is so orientated there is usually an appreciable signal effected thereby. This undesirable effect can be eliminated by the use of a balancing condenser 78, as shown in Fig. 2. This is simply a variable condenser with two sets of fixed plates, 81 and 82, and a set of moving plates 83. This condenser is adjusted until the capacity to ground on the side of the coil connected to the grid is equal to the capacity to ground on the side connected to the filament. This restores the sharpness of the position of minimum signal. The ground connection of the compensating condenser should be symmetrically placed so that the compensating adjustment of the condenser will be independent of the location of the transmitter.

For the initial adjustment of the apparatus, the coil 45 is set so that its plane is vertical, and so revolved that the projection on the field of the normal to this plane passing through the center of the coil, also passes through the center of the landing field point 37 of Fig. 1. The other two direction finders are similarly oriented. The three light projectors 127, 128 and 129 in Fig. 4 are also adjusted so that the projection of the beams of light, pass through the center of the field which is indicated by the point 37. The circuits from the three transmitters 67, of the three direction finders 21, 22, and 23 to the three repeaters 105, 106, and 107, are then closed. This is accomplished by closing switches which are not shown, connecting the four wires in the three cables 68 to the four wires of the three repeaters 105, 106 and 107. Batteries not shown are inserted in the common wires of these circuits.

At the same time switches are closed which are located adjacent to each direction finder 21, 22 and 23, and which turn on and off the light beams 131, 132 and 133, by closing or opening the circuits through the conductors 201, 202 and 203, brushes 183, 182 and 181, segments 163, 162 and 161 to the brushes 165, thence along shafts 114, casings 118, to lamps 119. The current returns through springs 121, plate 184, segment 164, brush 184, conductor 204, through a battery back to the switches located adjacent to the direction finders.

When an airplane 24 approaches the field 20 signals are transmitted from the airplane as already described, and are received by the three direction finders 21, 22 and 23. The signals received by these direction finders are heard in the head phones 94, and the operator orients the coil 45 by means of the handles 54 and 64, so that a minimum signal is received in the head phones 94. When this condition occurs the plane of the coil is normal to a line from the airplane to the center of the coil. The azimuth angles R, S, T, through which the three coils have been turned from their initial positions are transmitted by the electrical transmitters 67 to the three repeaters 105, 106 and 107, which cause the gears 111, 112 and 113 to be rotated through these angles, thereby turning the three light sources 127, 128 and 129 through the three angles R, S, T, as shown in Fig. 4. The point where the three light beams 131, 132 and 133 intersect on the disc 184 corresponds to the projection 33 of the airplane 24, on the surface of the earth. The lens system is then disposed so that the cross hairs 146 are in register with the point of intersection of the three light beams. This is effected by turning the cranks 148 and 249 which respectively cause the lens system to slide along the rod 143 and the plates 207 and 184 to rotate in unison. The rotation of the screw thread 144 is transmitted by means of bevel gears 149—245 and 242—243 to the slider 233, so that this slider will always be disposed in registered relationship with the lens system 145. Thus the lamp 234 will be located with respect to the map on the disc 207 in the same position that the airplane is with relation to the landing field 20.

As the plate 207 is rotated, and the block 236 is moved longitudinally, the arm 239 and roller 240 will take up a trailing position, the axis of which will be the same as the line of flight of the plane with respect to the ground, and this will be indicated on the map by the position of the pointer 210. In this way not only the location of the plane on the map is shown, but also the direction in which it is flying.

Figure 13:
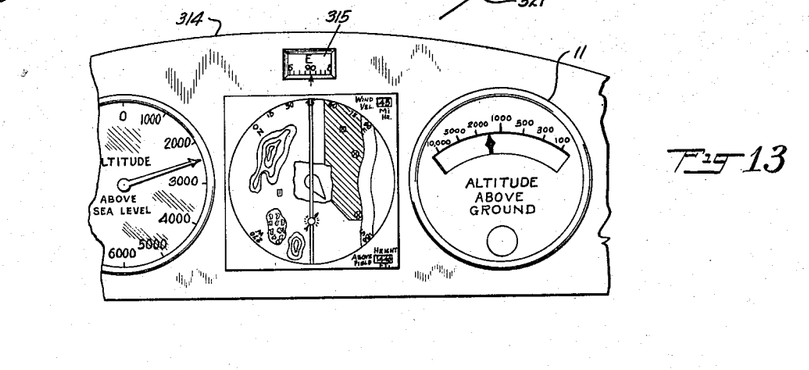
Fig. 13 is an elevation of the instrument board of the airplane.

The picture of this map, together with the position of the lamp 234 are picked up by the television transmission apparatus mounted in the casing 331 (see Fig. 11). This is a standard system in which the motor 335, rotates the drum 333 at a uniform speed by means of the synchronizing mechanism 337 and the holes 334 in this rotating drum scan the image formed by the lens 332 on the face of this drum. The light transmitted through these holes is focused by the lens 340 on to the photo electric cell 341, the current from which is amplified by the transmitter 343, and sent out as wireless waves from the antenna 344. These wireless signals are then received by the antenna 321, which conducts them to the brush 303, (Fig. 12). During half the revolution of the commutator 305, the signals are conducted to the brush 304, and thence by the conductor 319, to the television receiver 318, where they are amplified in a well known manner. The amplified signals are then impressed upon the neon tube 316 or other suitable variable source of illumination to control the light emitted therefrom. The light from the tube 316 passes through the holes 312 in the drum 311, as this drum is rotated by the motor 308, and forms an image of the map on the lens 313 as shown in Fig. 13. The speed of the motor 308 which is controlled by the synchronizing means 322 may be varied by turning the handle 323, so that the aviator can always correct for slight variations of the synchronizing means. The aviator therefore, will always have in front of him a view of the landing field and the surrounding country with a bright spot, indicating the position of his plane with respect to the landing field. He can also tell the direction of the wind by means of the pointer 209, the velocity of the wind being given in the upper right hand corner, and the altitude of the plane above the landing field in the lower right hand corner. The velocity of the wind is determined by any suitable means such as a wind velocity meter, and is set on the dial 252 by means of the repeater 255, which is actuated by a transmitter which is either operated automatically or manually by the wind velocity meter. The movement of the transmitter is then imparted to the dial 252 through pinion 254 and gear 253.

The altitude of the plane is determined by measuring the angles A, B and C which are transmitted by the transmitters 57 on the three direction finders 21, 22 and 23 to an airplane range finder system of any well known design, such as that described in Pat. 1,408,504. The angles R. S. T. already referred to are also transmitted to this range finder. The altitude of the plane determined by this means is then set on the strip 277, by rotating the drum 271 by means of the repeater 264, the associated transmitter of which is operated either automatically or manually by the range finding apparatus. Mounted on the instrument board 14, is an altimeter 11, which indicates to the pilot his elevation above the ground. This altimeter may be of any suitable construction and may take the form of radio altimeter described in Science and Invention for February 1929, pages 952 and 953, this type of altimeter operating in response to the reflection from the ground of radio waves propagated from the plane. The pilot is informed therefrom of his altitude above the ground from two different sources and thereby has a further assurance of his elevation.

Figure 15:
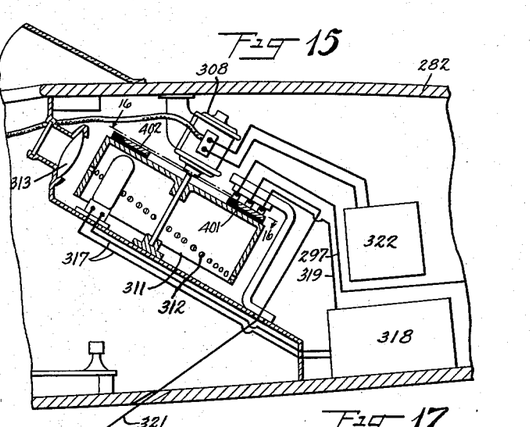
Fig. 15 is a sectional view showing a modified form of television receiving apparatus in the airplane.
Figure 16:
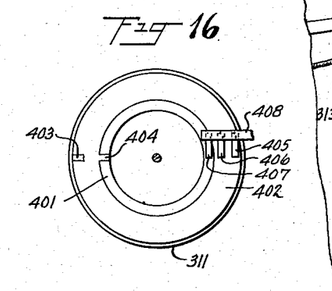
Fig. 16 is a section taken on line 16—16 of Fig. 15.

Instead of omitting every other picture as described in the previous system, a system may be used as shown in Fig. 15, which omits only a single line in each picture during which time transmission of the signal takes place. In this system the drum 311, carries a circular segment of insulating material 401, on which is mounted a circular segment of conducting material 402, provided with a slot 403 and a tongue 404. Rolling on these segments are three rollers 405, 406 and 407, which are mounted on a strip of insulation 408, carried by the frame of the airplane. Rollers 405, 406 and 407 are connected to conductor 319, antenna 321 and conductor 297.

In this systm, the brushes 405, 406 are electrically connected by the segment 402 during the complete revolution with exception of a brief interval of time, when they pass over the insulation in the slot 403. During this time the brushes 406 and 407 are connected together, which allows a short impulse to be transmitted from the signal transmitter 281 to the antenna 321. During the rest of the revolution, however, the television receiving apparatus is connected to the antenna, so that the image of the field is being formed on the lens 313.

In place of the television system already described, one using a Braum tube may be used. This television system is described in the patent of John Hays Hammond, Jr. No. 1,725,710 issued August 20, 1929, and entitled Systems and methods of television.

In place of the radio pick-up device of the direction finders shown in Fig. 2, a system of sound direction finding may be used, as shown in Fig. 18. This consists of a plurality of horns 421, located in a frame 422, which corresponds to the frame 46 of Fig. 2. At the end of these horns are mounted microphones 423, which are connected in series to an amplifier 424. The output of this amplifier goes to the head phones 94. This system is operated in the same manner as that described in connection with Fig. 2, so that the plane of the frame 422 will be normal to the line joining the direction finder to the plane when a maximum signal is received in the head phones 94.

It is to be noted that the pilot will be able to see constantly the horizontal position of his plane with respect to a fixed location such as a landing field. He is also informed of his elevation above the ground and his direction of flying, so that he has an accurate survey of the characteristics of the landing field and his exact position with reference thereto, so that if the pilot is destined to the landing field he will be able to make a safe landing under any conditions which may be adverse to the visibility of the field.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What I claim is:

1. In an aeronautical guide system, a plurality of direction finders, including pick-up devices, means for orienting said pick-up devices in accordance with the direction of the signals emitted from an aircraft, whereby said members will respond with predetermined effect to the signals impressed thereon, and means responsive to the orientation of said pick-up devices for transmitting the azimuthal angle of rotation of said pick-up devices to a plotting mechanism, whereby the location of the projection of the aircraft upon the earth can be determined, a transmission system comprising scanning means for scanning said plotting mechanism, and a receiving system in said aircraft for receiving and translating signals transmitted by said last mentioned transmission system.

2. In combination with an aircraft having means for transmitting signals, a plurality of direction finders, each thereof including a pick-up device, means for rotating said pick up devices in azimuth in accordance with the direction of the signals emitted from the aircraft, independent means for rotating each of said pick-up devices about a horizontal axis in accordance with the direction of the signals emitted from the aircraft, automatic means for transmitting the angle of azimuthal rotation of each of said pickup devices to a plotting mechanism whereby the location of the projection of the aircraft upon the landing field may be determined, and means for transmitting the angle of rotation of each of the pick-up devices about its horizontal axis to a range finder whereby the elevation of the aircraft above the ground may be determined.

3. A landing field guide system which compries in combination with an aircraft, a plurality of direction finders disposed in various parts of an aircraft landing field, said direction finders including signal pick-up devices, means for sending signals from the aircraft, means for orienting said pick-up devices according to the direction of the signals, a plurality of rotatably mounted light projecting members located to correspond in mirror image relationship with the position of said direction finders on the landing field, said projecting members being rotatably responsive to the orientation of said pick-up device, whereby the rays emitted from said members meet at a point, a picture of the landing field and intermediate vicinity, and a position designating member associated with said picture, means for actuating said member so as to place it in a position on said picture corresponding to the displacement of the intersecting points of the rays whereby the course of the projection of the aircraft on the landing field or its intermediate vicinity is traced on said picture, and means for transmitting said picture and the course traced by said designating member to the aircraft.

4. In a plotting mechanism of the class described, a rotatable disc, a designating means associated with said disc, a roller member secured to said designating means and adapted to co-operate with the face of said disc, means for effecting a relative parallel displacement between said designating means and said disc, and a pointer affixed to said designating means whereby the direction of the resultant displacement of the designating means with respect to the disc will be indicated thereon.

5. In a system for guiding an aircraft towards a landing field, a plurality of direction finders, a plotting mechanism comprising a first and second rotatable disc, a plurality of light projecting members mounted on said first disc, and rotatably operable in accordance with the orientation of said direction finders, an eye piece, means for effecting a relative parallel displacement of said eye piece with respect to said first disc, whereby said eye piece can be maintained in registration with the intersection of the rays emitted from said light projecting member, a designating member mounted for indication with respect to said second disc, and means operable in accordance with the relative displacement of said first disc and said eye piece for effecting a corresponding relative displacement of said designating member and said second disc.

6. A navigational guide system which comprises in combination with a moving craft, means for propagating signals from said craft, a plurality of direction finders located at a distance from said craft, said direction finders including signal pick-up devices, means for orienting said pick-up devices from a fixed direction in accordance with the direction of the signals emitted from the said craft, whereby said devices will respond to said signals with predetermined characteristics; a first rotatable disc, a second rotatable disc associated with said first disc and mounted in aligned parallel relationship therewith, a plurality of light projecting members mounted on said first disc and located to correspond in mirror image relationship with the position of said direction finders, said projecting members being rotatably responsive to the orientation of said pick-up device whereby the rays emitted from said member meet at a point, an eye piece mounted for observation of said rays, means for effecting a relative parallel displacement of said eye-piece with respect to said first disc, whereby said eye piece can be maintained in registration with the intersection of the rays emitted from said light projecting members, a designating member mounted for indication with respect to said second disc, means operable in accordance with the relative displacement of said first disc and said eye piece for effecting a corresponding relative displacement of said designating member and said second disc, and means for informing the pilot of the craft his position with reference to a fixed location as indicated by said second disc and the designating member associated therewith.

7. The combination of a craft having means for transmitting signals, a plurality of receiving stations having means for receiving signals transmitted by said craft and for determining the direction of the incoming signals, a television transmission system including a picture surface comprising a chart, means controlled by said receiving stations for determining the position of said craft relative to said chart, a transmission system comprising a scanning means for scanning said chart and a receiving system in said craft for receiving and translating signals transmitted by said last mentioned transmission system.

8. The combination of a craft having means for transmitting signals, a plurality of receiving stations having means for receiving signals transmitted by said craft and for determining the direction of the incoming signals, a television transmission system including a picture surface comprising a chart of the immediate vicinity of said stations and for producing a plurality of beams of light controlled by said receiving stations for determining the position of said craft on said chart, a transmission system comprising a scanning means for scanning said chart and a receiving system in said craft for receiving and translating signals transmitted by said last mentioned transmission system.

9. The combination of a craft having means for transmitting signals, a plurality of receiving stations having means for receiving signals transmitted by said craft and for determining the direction of the incoming signals, a television transmission system including a picture surface comprising a chart of the immediate vicinity of said station, means for producing a plurality of beams of light controlled by said receiving stations for determining the position of said craft on said chart, a transmission system including a scanning means for scanning said chart, a receiving system on said craft for receiving and translating signals transmitted by said last mentioned transmission system and means on said craft for alternately transmitting signals first referred to and receiving signals from said last named transmission system.

10. The combination of a craft having means for periodically transmitting signals, a plurality of receiving stations having means for receiving signals transmitted by said craft and for determining the direction of the incoming signals, a television transmission system including a picture surface comprising a chart representing in miniature the layout of the land in the vicinity of the said stations, means comprising a plurality of light sources disposed with respect to said chart in the same relative positions as said receiving stations with respect to the location represented by the chart controlled by said receiving stations for determining the position and the direction of travel on said chart of said craft, a transmission system comprising a scanning means for scanning said chart and a receiving system on said craft for receiving and translating signals transmitted by said last mentioned transmission system.

11. In a navigational guide system, a mobile body adapted to transmit signaling energy, a landing port, directional receiving stations disposed in geographically separated positions at said landing port, said receiving stations each including a loop, means for selectively orienting the loop at each of said receiving stations, a central station including a television transmitter and a charting device, said charting device being provided with a miniature model of the landing port, a displaceable means associated with the model of the landing port, said last-named means being adapted to represent in relation to the model the projection of the mobile craft relative to the landing port, scanning means associated with the television transmitter, control circuits extending between the central station and each of the receiving stations, mechanical means connected in said control circuits and responsive to the orientation of said loops at said directional receiving stations for determining the point on the model indicated as the intersection of the loop directions, the scanning means of the television transmitter being positioned relative to the model so as to permit scanning the model and the displaceable means whereby signals may be transmitted by the television transmitter from which signals may be derived a picture of the model and displaceable means, a receiver on said mobile body adapted to receive the energy emitted by the television transmitter to thereby indicate on the mobile body the position of the mobile body with respect to the landing port.

12. In a navigation system, a craft having means for transmitting signaling energy, a beacon station comprising receiving stations disposed in geographically separated positions along the route of the craft and a central station, said receiving stations each including means comprising an actuatable loop antenna for receiving the signaling energy transmitted by the craft and for determining the direction of the incoming energy, said central station being provided with a television transmission system including a picture surface comprising a chart or replica of the immediate vicinity of the beacon station, control circuits between the central station and each of the receiving stations said control circuits including means responsive to the actuation of said loop antennæ for determining the point indicated as the intersection of the loop directions, a displaceable means associated with the chart for indicating the position of the craft on the chart and a scanning means arranged so as to scan the chart to thereby transmit signals from said transmission system which signals are capable of being translated into a picture of the chart and the displaceable means and a receiving system on the craft for receiving and translating signals transmitted by the television transmission system.

JOHN HAYS HAMMOND, Jr.